(12) United States Patent
Liang et al.

(10) Patent No.: US 11,507,261 B2
(45) Date of Patent: *Nov. 22, 2022

(54) SUSPEND BUTTON DISPLAY METHOD AND TERMINAL DEVICE

(71) Applicant: Huawei Technologies Co., Ltd., Guangdong (CN)

(72) Inventors: Jun Liang, Shenzhen (CN); Xue Yang, Shenzhen (CN); Kang Li, Shenzhen (CN); Lina Tao, Shenzhen (CN); Haigen Lu, Guangzhou (CN); Guangfeng Gao, Shenzhen (CN); Yu Song, Shenzhen (CN); Xueyan Huang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/308,687

(22) Filed: May 5, 2021

(65) Prior Publication Data

US 2021/0255761 A1 Aug. 19, 2021

Related U.S. Application Data

(63) Continuation of application No. 16/847,119, filed on Apr. 13, 2020, now Pat. No. 11,016,644, which is a
(Continued)

(30) Foreign Application Priority Data

Oct. 16, 2017 (CN) .......................... 201710960495.6

(51) Int. Cl.
*G06F 3/04845* (2022.01)
*G06F 3/04847* (2022.01)

(52) U.S. Cl.
CPC ...... *G06F 3/04845* (2013.01); *G06F 3/04847* (2013.01)

(58) Field of Classification Search
CPC .......................... G06F 3/04845; G06F 3/04847
See application file for complete search history.

(56) References Cited

U.S. PATENT DOCUMENTS 6,084,598 A 7/2000 Chekerylla
6,211,856 B1 * 4/2001 Choi ..................... G06F 3/0481
345/666

(Continued)

FOREIGN PATENT DOCUMENTS

CN 101739191 A 6/2010
CN 102346639 A 2/2012
(Continued)

OTHER PUBLICATIONS

Victor Sirghii, "How to simulate a button click within the code having visual feedback from the button on that action", published to a URL as provided on p. 6 of the document that is too large to fit here, retrieved Nov. 5, 2021 (Year: 2009).*

(Continued)

*Primary Examiner* — Shourjo Dasgupta
(74) *Attorney, Agent, or Firm* — Womble Bond Dickinson (US) LLP

(57) ABSTRACT

A method and a terminal device for providing a suspend button display are disclosed in order to improve display flexibility of a suspend button. In the solutions, when a terminal device detects that a tap operation or a second touch and hold operation, the terminal device may the suspend button to present an effect that the graphic displayed in the suspend button is zoomed in or zoomed out, and then display the suspend button restored to the default state. Therefore, according to the method, the display flexibility of the
(Continued)

suspend button can be improved, so that visual experience of a user is improved.

18 Claims, 9 Drawing Sheets

Related U.S. Application Data continuation of application No. PCT/CN2018/109896, filed on Oct. 11, 2018.

(56) References Cited

U.S. PATENT DOCUMENTS

| | | | |
|---|---|---|---|
| 7,271,815 B2* | 9/2007 | Clas | G06T 15/503 |
| | | | 345/592 |
| 7,945,503 B2* | 5/2011 | Gottlieb | G06Q 40/04 |
| | | | 705/37 |
| 8,046,721 B2 | 10/2011 | Chaudhri et al. | |
| 2006/0026535 A1* | 2/2006 | Hotelling | G06F 3/04883 |
| | | | 715/863 |
| 2008/0231608 A1 | 9/2008 | Nagata | |
| 2009/0058521 A1 | 3/2009 | Chaudhri et al. | |
| 2010/0031203 A1 | 2/2010 | Morris et al. | |
| 2010/0281121 A1* | 11/2010 | Cheng | H04M 1/72436 |
| | | | 709/206 |
| 2011/0083104 A1 | 4/2011 | Minton | |
| 2011/0163986 A1 | 7/2011 | Lee et al. | |
| 2012/0030635 A1 | 2/2012 | Miyazaki | |
| 2012/0044173 A1 | 2/2012 | Homma et al. | |
| 2012/0066640 A1 | 3/2012 | Kwak et al. | |
| 2012/0127102 A1* | 5/2012 | Uenohara | G06F 3/041 |
| | | | 345/173 |
| 2012/0233545 A1 | 9/2012 | Ikeda et al. | |
| 2012/0274662 A1* | 11/2012 | Kim | G11B 27/34 |
| | | | 345/650 |
| 2012/0290978 A1* | 11/2012 | Devecka | G06Q 30/0273 |
| | | | 715/810 |
| 2013/0117698 A1 | 5/2013 | Park et al. | |
| 2014/0098108 A1* | 4/2014 | Fong | G06F 3/04817 |
| | | | 345/475 |
| 2014/0108982 A1 | 4/2014 | Pasceri et al. | |
| 2014/0109022 A1 | 4/2014 | Wei et al. | |
| 2014/0123081 A1 | 5/2014 | Park et al. | |
| 2014/0245227 A1* | 8/2014 | Xu | G06F 11/3058 |
| | | | 715/835 |
| 2014/0344731 A1 | 11/2014 | Holz | |
| 2015/0178972 A1* | 6/2015 | Barcay | G06T 13/20 |
| | | | 345/419 |
| 2015/0220216 A1 | 8/2015 | Wigdor et al. | |
| 2015/0268743 A1 | 9/2015 | Takeuchi | |
| 2016/0004416 A1 | 1/2016 | Kim et al. | |
| 2016/0034153 A1 | 2/2016 | Lejeune et al. | |
| 2016/0127102 A1* | 5/2016 | Kim | H04L 5/0026 |
| | | | 370/330 |
| 2016/0224235 A1* | 8/2016 | Forsström | G06F 3/04845 |
| 2016/0342307 A1 | 11/2016 | Huang et al. | |

FOREIGN PATENT DOCUMENTS

| | | |
|---|---|---|
| CN | 102375683 A | 3/2012 |
| CN | 102696004 A | 9/2012 |
| CN | 102722334 A | 10/2012 |
| CN | 103635873 A | 3/2014 |
| CN | 104932809 A | 9/2015 |
| CN | 105930147 A | 9/2016 |
| CN | 106843631 A | 6/2017 |
| CN | 107870723 A | 4/2018 |
| WO | 2014069917 A1 | 5/2014 |
| WO | 2016167094 A1 | 10/2016 |
| WO | 2017100761 A1 | 6/2017 |

OTHER PUBLICATIONS

"How to Create a UI Sliders Set in Photoshop", published on Apr. 20, 2012 to https://designmodo.com/create-ui-sliders/, retrieved Nov. 6, 2021 (Year: 2012).*

"Make object scale pulse smoothly when selected", published on Jan. 24, 2016 to https://answers.unity.com/questions/1132337/make-object-scale-pulse-when-selected.html, retrieved Mar. 25, 2022. (Year: 2016).*

"How to make an object pulse continuously?", published on Mar. 8, 2017 to https://answers.unity.com/questions/1323397/how-to-make-an-object-pulse-continuously.html, retrieved Mar. 25, 2022. (Year: 2017).*

Nick Babich, "Button UX Design: Best Practices, Types and States", published on Mar. 15, 2016 to https://uxplanet.org/button-ex-design-best-practices-types-and-state-647cf4ae0fc6, retrieved Aug. 2, 2020 (Year: 2016).

Kumar Animesh, "How To Create an iOS Style Swipe Button for Android", published on Apr. 22, 2016 to https://www.sitepoint.com/creating-an-ios-style-swipe-button-for-android/, retrieved Aug. 2, 2020 (Year: 2016).

"Layer Animations & Timeline", published on Aug. 5, 2015 to https://www.themepunch.com/revslider-se-doc/layer-animations-timeline/, retrieved Aug. 2, 2020 (Year: 2015).

"An Introduction to Icon Animation Techniques", published on Nov. 29, 2016 to https//www.androiddesignpatterns.com/2016/11/introduction-to-icon-animation-techniques.html, retrieved Aug. 2, 2020 (Year: 2016).

Wikipedia, "Isosurface", https://en.wikipedia.org/w/index.php?title=Isosurface&oldid=965882205 with a last edit on Jul. 4, 2020, retrieved Aug. 3, 2020 (Year: 2020).

Wikipedia, "Metaballs", https://en.wikipedia.org/w/index.php?title=Metaballs&oldid=969185678 with a last edit on Jul. 23, 2020, retrieved Aug. 3, 2020 (Year: 2020).

* cited by examiner

SUSPEND BUTTON DISPLAY METHOD AND TERMINAL DEVICE

CROSS-REFERENCE TO RELATED APPLICATIONS

This application is a continuation of U.S. patent application Ser. No. 16/847,119, filed on Apr. 13, 2020, which is a continuation of International Application No. PCT/CN2018/109896, filed on Oct. 11, 2018, which claims priority to Chinese Patent 201710960495.6, filed on Oct. 16, 2017, the disclosures of which are incorporated herein by reference in their entireties.

TECHNICAL FIELD

This application relates to the field of terminal device technologies, and in particular, to a suspend button display method and a terminal device.

BACKGROUND

To reduce physical buttons without affecting operation convenience of a user, a suspend navigation button (briefly referred to as a suspend button) is set in many terminal devices. The user may operate a suspend button displayed on a touch display screen, to enable a terminal device to perform a specific function.

Currently, a suspend button in a terminal device is equivalent to an image. Therefore, when a user operates a suspend button on a touch display screen of a terminal device, there are usually only the following several interaction modes between the user and the suspend button.

1. When the user drags the suspend button, a location of the suspend button on the touch display screen changes as a finger of the user moves on the touch display screen.

2. When the user touches and holds or taps the suspend button, specified function icons are displayed around the suspend button; or the suspend button disappears, and a separate function zone is displayed on the touch display screen, where the function zone includes specified function icons.

It may be learned from the foregoing description that the suspend button in a conventional design has an undiversified interaction mode with the user, and has relatively poor display flexibility.

SUMMARY

This application provides a suspend button display method and a terminal device, to improve display flexibility of a suspend button.

According to a first aspect, a suspend button display method is provided. The method may include the following steps.

First, a terminal device displays a suspend button in a default state on a touch display screen, where a first graphic is displayed in the suspend button; then, the terminal device detects a touch operation of a target object on the suspend button; and when the terminal device detects a sliding operation, the terminal device controls, in response to the detected sliding operation, the first graphic to present an effect of a dynamic change on the touch display screen along with a sliding track of the sliding operation, where the dynamic change includes a dynamic change generated when the first graphic is stretched in a direction opposite to a sliding direction.

When the terminal device detects that the target object performs the sliding operation on the suspend button, the terminal device may control the suspend button to present an effect of a dynamic change. For the first graphic in the suspend button, an effect of a dynamic change that is generated when an object having mass, elasticity, and toughness is dragged in a physical world may be simulated, so that a user explicitly senses that the touch operation acts on the suspend button. Therefore, according to the method, display flexibility of the suspend button can be improved, so that visual experience of the user is improved.

In one embodiment, the dynamic change generated when the first graphic is stretched in the direction opposite to the sliding direction includes protrusion deformation occurring on the first graphic in the direction opposite to the sliding direction.

According to this embodiment, when the user performs the sliding operation on the suspend button, the suspend button may present an inertia lag phenomenon that is also presented when an elastic object is dragged, so that user experience is closer to that in the physical world.

In one embodiment, a protrusion deformation degree of the first graphic may be related to a parameter such as a sliding track distance of the sliding operation, a touch force of the target object, or a sliding speed of the target object. For example, a larger sliding track distance of the sliding operation, a larger touch force of the target object, or a higher sliding speed of the target object indicates a higher protrusion deformation degree of the first graphic. In this way, the user can change the protrusion deformation of the first graphic by adjusting the target object.

In one embodiment, in the suspend button in the default state, a default state of the first graphic is circular; and correspondingly, the first graphic during the dynamic change is water droplet-shaped or quasi-elliptical. These graphics can achieve a smoother effect, and enhance user experience.

In one embodiment, to present the effect of the dynamic change of the first graphic, before the sliding operation ends or a deformation upper limit of the first graphic is not reached, the first graphic may present the effect of the dynamic change through a plurality of times of changes.

In one embodiment, in a dynamic change process of the first graphic, the first graphic changing each time is generated by the terminal device by performing a metaball algorithm on a reference graphic and an auxiliary circle. A size of the reference graphic is the same as that of the first graphic in the default state, and a first circle center distance is less than a second circle center distance, where the first circle center distance is a distance between a circle center of the reference graphic and a circle center of the auxiliary circle when the first graphic changing for the $N^{th}$ time is generated, and the second circle center distance is a distance between the circle center of the reference graphic and the circle center of the auxiliary circle when the first graphic changing for an $(N+1)^{th}$ time is generated, where N is an integer greater than or equal to 1.

According to this embodiment, when the user performs the sliding operation on the suspend button, the suspend button may present a water droplet shape or a quasi-ellipse, so that user experience is closer to that in the physical world.

In one embodiment, before the protrusion deformation occurs on the first graphic, the terminal device divides the first graphic in the default state into two parts based on a division line perpendicular to the sliding direction, determines one part located in the direction opposite to the sliding direction relative to the division line as a first part, then performs stretching processing on the first part when determining the first graphic changing for a first time, to obtain the first graphic changing for the first time, and performs stretching processing on the first part changing for an $(M-1)^{th}$ time when determining the first graphic changing for an $M^{th}$ time, where M is an integer greater than 2.

According to this embodiment, when the user performs the sliding operation on the suspend button, the suspend button may present a water droplet shape or a quasi-ellipse, so that user experience is closer to that in the physical world.

In one embodiment, in a dynamic change process of the first graphic, the first graphic changing for the first time is generated by the terminal device by performing compression processing on a second part of the first graphic in the default state, and the first graphic changing for the $M^{th}$ time is generated by the terminal device by performing compression processing on the second part of the first graphic changing for the $(M-1)^{th}$ time, where the second part of the first graphic in the default state is a part other than the first part in the two parts into which the first graphic in the default state is divided.

In one embodiment, a second graphic is further displayed in the suspend button; and when the suspend button is in the default state, a whole of the first graphic covers the second graphic.

In one embodiment, in a process in which the first graphic presents the effect of the dynamic change along with the sliding track of the sliding operation, the whole or a part of the first graphic covers the second graphic.

In one embodiment, in the process in which the first graphic presents the effect of the dynamic change along with the sliding track of the sliding operation, a dynamic change generated when the second graphic is stretched in the direction opposite to the sliding direction occurs on the second graphic.

In one embodiment, protrusion deformation may also occur on the second graphic in the direction opposite to the sliding direction. For a method for generating the second graphic changing each time, refer to the method for generating the changing first graphic. Details are not described herein again.

In one embodiment, the second graphic is not displaced along with the sliding track. A location of the second graphic is fixed, and therefore, during the dynamic change of the first graphic, an effect that the first graphic moves relative to the second graphic may be presented.

In one embodiment, when a dynamic change generated due to stretching occurs on each of the first graphic and the second graphic, a protrusion deformation degree of the second graphic is less than the protrusion deformation degree of the first graphic.

In one embodiment, the first graphic is displayed at a first display layer, the second graphic is displayed at a second display layer, and the first display layer is located above the second display layer; when the suspend button is in the default state, a whole of the first display layer covers the second display layer; and in the process in which the first graphic presents the effect of the dynamic change along with the sliding track of the sliding operation, the whole or a part of the first display layer covers the second display layer, so that in the process in which the first graphic presents the effect of the dynamic change along with the sliding track of the sliding operation, the whole or the part of the first graphic covers the second graphic.

According to this embodiment, it can be ensured that in the process in which the first graphic presents the effect of the dynamic change along with the sliding track of the sliding operation, the whole or the part of the first graphic covers the second graphic.

In one embodiment, the terminal device obtains a plurality of to-be-displayed image frames corresponding to an effect of a dynamic change that the whole or the part of the first graphic covers the second graphic in the process in which the first graphic presents the effect of the dynamic change along with the sliding track of the sliding operation, and sequentially displays the plurality of image frames, so that in the process in which the first graphic presents the effect of the dynamic change along with the sliding track of the sliding operation, the effect of the dynamic change that the whole or the part of the first graphic covers the second graphic is achieved.

According to this embodiment, it can be ensured that in the process in which the first graphic presents the effect of the dynamic change along with the sliding track of the sliding operation, the whole or the part of the first graphic covers the second graphic.

In one embodiment, the plurality of image frames are obtained through changing based on a group of image frames.

In one embodiment, before the terminal device detects the sliding operation, the terminal device detects a first touch and hold operation, where the first touch and hold operation is an operation of the target object on the suspend button for a touch time exceeding first duration; and the terminal device enables, in response to the detected first touch and hold operation, a function of responding to the sliding operation.

According to this embodiment, the user may enable, through the first touch and hold operation, the terminal device to enable the function of responding to the sliding operation, to avoid a power consumption waste and a resource waste that result from enabling of the function by the terminal device for a long time.

In one embodiment, when the terminal device detects that the sliding operation ends, the terminal device displays the suspend button restored to the default state. In one embodiment, in the terminal device, the suspend button changing last time may be restored to the suspend button in the default state through a transition animation, so that a change of the suspend button can have a transition process, and a problem of relatively poor visual effect of the user due to abrupt and direct replacement is avoided.

In one embodiment, when the terminal device detects that the sliding operation ends, the terminal device executes an instruction corresponding to the sliding operation.

In one embodiment, the dynamic change further includes displacement of the first graphic that is generated along with the sliding track. In this case, when the displacement of the first graphic that is generated along with the sliding track of the sliding operation exceeds a specified distance or the first graphic moves to a specified location, the terminal device executes an instruction corresponding to the sliding operation.

In one embodiment, based on the foregoing design, the terminal device may further display the suspend button restored to the default state.

In one embodiment, when the terminal device detects a tap operation or a second touch and hold operation, the terminal device controls, in response to the detected tap operation or second touch and hold operation, the suspend button to first present an effect that the first graphic is zoomed in or zoomed out by a specified proportion, and then displays the suspend button restored to the default state, where the second touch and hold operation is an operation of the target object on the suspend button for a touch time exceeding second duration.

According to this embodiment, the suspend button may notify, through a zoom effect, the user that the suspend button has been tapped or touched and held. Therefore, according to the method, the display flexibility of the suspend button and the visual experience of the user can also be improved.

In one embodiment, when the first graphic is zoomed in or zoomed out by the specified proportion, a visual parameter of the first graphic changes, where the visual parameter is at least one of the following: transparency, color, brightness, and gradation.

In one embodiment, the terminal device executes an instruction corresponding to the tap operation or the second touch and hold operation.

In one embodiment, the suspend button includes a first display area and a second display area, where the first display area is used to display the suspend button, the second display area is set to be transparent (to be specific, no content is displayed in the second display area), and an area of the first display is greater than an area of the second display area.

In this case, the terminal device detects the touch operation of the target object on the suspend button by using the following step:

detecting, by the terminal device, a touch operation of the target object at a location of the second display area on the touch display screen, to detect the touch operation of the target object on the suspend button.

According to this embodiment, the suspend button presenting the dynamic effect can be displayed on the touch display screen of the terminal device, and further, it can be ensured that the user can operate a home screen or a presentation interface that is covered by the suspend button presenting the dynamic effect.

In one embodiment, the suspend button is a virtual button that has an instruction trigger function and that suspends on a home screen of the terminal device or an uppermost layer of a program interface that is currently running.

According to a second aspect, a terminal device is provided. The terminal device includes units or modules configured to perform the steps in the first aspect.

According to a third aspect, a terminal device is provided. The terminal device includes at least one processing element and at least one storage element. The at least one storage element is configured to store a program and data. The at least one processing element is configured to perform the method according to the first aspect of this application.

According to a fourth aspect, a computer storage medium is provided. The storage medium stores a software program. The software program may implement the method according to any one of the first aspect or the embodiments of the first aspect when being read and executed by one or more processors.

According to a fifth aspect, a computer program product including an instruction is provided. When the computer program product runs on a computer, the computer is enabled to perform the method according to the foregoing aspects.

According to a sixth aspect, a chip system is provided. The chip system includes a processor, configured to support a terminal device in implementing functions in the first aspect. In one embodiment, the chip system further includes a memory, configured to store a program instruction and data that are necessary to the terminal device. The chip system may include a chip, or may include a chip and another discrete device.

In the solutions provided in the embodiments of this application, when the terminal device detects that the target object performs the sliding operation on the suspend button, the terminal device may control the suspend button to present the effect of the dynamic change. In this way, the suspend button may present a plurality of display forms. Therefore, according to the method, the display flexibility of the suspend button can be improved, so that the visual experience of the user is improved.

DESCRIPTION OF EMBODIMENTS

Figure 1:
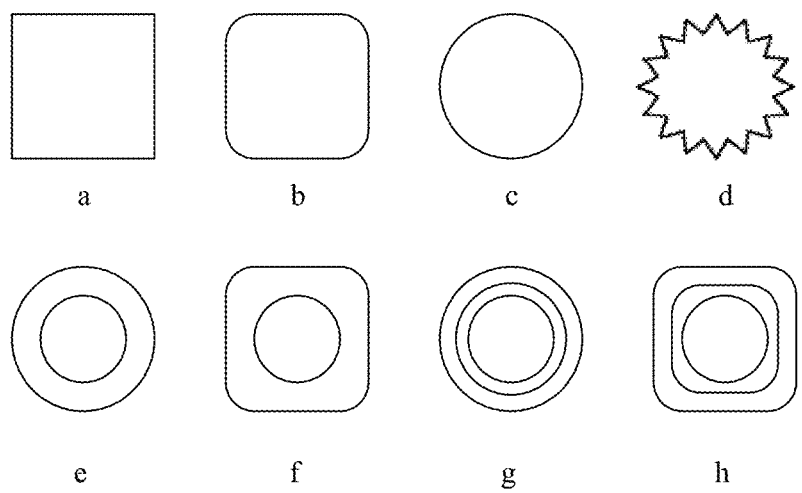
FIG. 1 is a diagram of an example of a suspend button according to an embodiment of this application.

This application provides a suspend button display method and a terminal device, to improve display flexibility of a suspend button. The method and the terminal device are based on same inventive conception. A problem resolving principle of the method is similar to that of the terminal device. Therefore, implementation of the apparatus and implementation of the method may refer to each other. Repetitions are not described.

In solutions provided in embodiments of this application, when the terminal device detects that a target object performs a sliding operation on a suspend button, the terminal device may control the suspend button to present an effect of a dynamic change. In this way, the suspend button may present a plurality of display forms. Therefore, according to the method, the display flexibility of the suspend button can be improved, so that visual experience of a user is improved.

Some terms in this application are explained and described below, to facilitate understanding of a person skilled in the art.

(1). The terminal device is a device that can perform human-device interaction by using a touch display screen.

The user may operate the touch display screen by using the target object, so that the terminal device performs a specific function, and the terminal device can also display a user interface by using the touch display screen. The terminal device may include, for example, a household intelligent terminal (including an air conditioner, a refrigerator, an electric cooker, a water heater, and the like), a business intelligent terminal (including a viewphone set, a conference desktop intelligent terminal, and the like), a wearable device (including a smartwatch, smart glasses, and the like), a financial intelligent terminal, a smartphone, a tablet computer, a personal digital assistant (PDA), an in-vehicle device, and a computer.

(2). The target object is an object that can be detected and positioned by the touch display screen when approaching or touching the touch display screen of the terminal device, and for example, is a human body or a manually entering tool, such as a stylus that is commonly used by the user.

(3). The suspend button is a virtual button that has an instruction trigger function and that suspends on a home screen of the terminal device or an uppermost layer of a program interface that is currently running. Generally, the suspend button is designed as a specific shape, to facilitate identification of the user. Therefore, the suspend button includes at least one graphic element. It should be noted that the embodiments of this application do not limit a type of the graphic element displayed by the suspend button.

In one embodiment, the suspend button may present an effect of a dynamic change, and the dynamic change is usually based on a shape of the suspend button in a default state. Therefore, the graphic element in the suspend button in the default state is usually a regular graphic. The default state is a state formed when the suspend button is not operated by the user and does not present the effect of the dynamic change, namely, an initial state of the suspend button.

In the default state, the graphic element in the suspend button is also in a default state.

One graphic may be displayed in the suspend button. For example, in the default state, the graphic is a (right-angle or rounded-corner) square, a circle, a polygonal-star shape, or the like. For example, the suspend button is suspend buttons in a default state shown in figures a to d in FIG. 1. Alternatively, a plurality of graphics may be displayed in the suspend button, where the plurality of graphics are graphics of a same type, and for example, the suspend button is suspend buttons in a default state shown in figures e and g in FIG. 1; or the plurality of graphics include graphics of different types, and for example, the suspend button is suspend buttons in a default state shown in figures f and h in FIG. 1.

It should be noted that the suspend buttons in FIG. 1 do not limit the shape of the suspend button. In addition, FIG. 1 shows only examples of a factor, namely, the shape, of the suspend button. In one embodiment, the graphic elements in the suspend button may be differentiated by using visual parameters such as color, transparency, brightness, and gradation. No further example is provided herein.

(4) A touch operation is implemented by the user by approaching or touching the touch display screen of the terminal device by using the target object. For example, when the user touches a location of the suspend button on the touch display screen by using the target object, the target object performs the touch operation on the suspend button. Therefore, it may be understood that the touch operation of the target object on the suspend button is not a direct operation of the target object on the suspend button, but is implemented by the target object by touching, through the touch display screen, an area of the location in which the suspend button is displayed.

Currently, commonly used types of the touch operation include a tap (including single-tap, double-tap, and three-tap) operation, a touch and hold operation, a sliding operation, and the like.

(5). A display area is also referred to as a view. A same display interface includes at least one layer of display area. Different display areas may display different user interfaces. The suspend button needs to suspend on the home screen or the uppermost layer of the program interface that is currently running. Therefore, when a suspend button is displayed on a display interface, the display interface includes a plurality of layers of display areas. A bottom-layer display area is used to display the home screen or the program interface, and at least one other display area is used to display the suspend button.

(6). "A plurality of" refers to two or more.

(7). "And/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

In addition, it needs to be understood that, in description of this application, terms such as "first" and "second" are used only for the purpose of differentiated description, and cannot be understood as indicating or implying relative importance or a sequence.

The following specifically describes the embodiments of this application with reference to the accompanying drawings.

Figure 2:
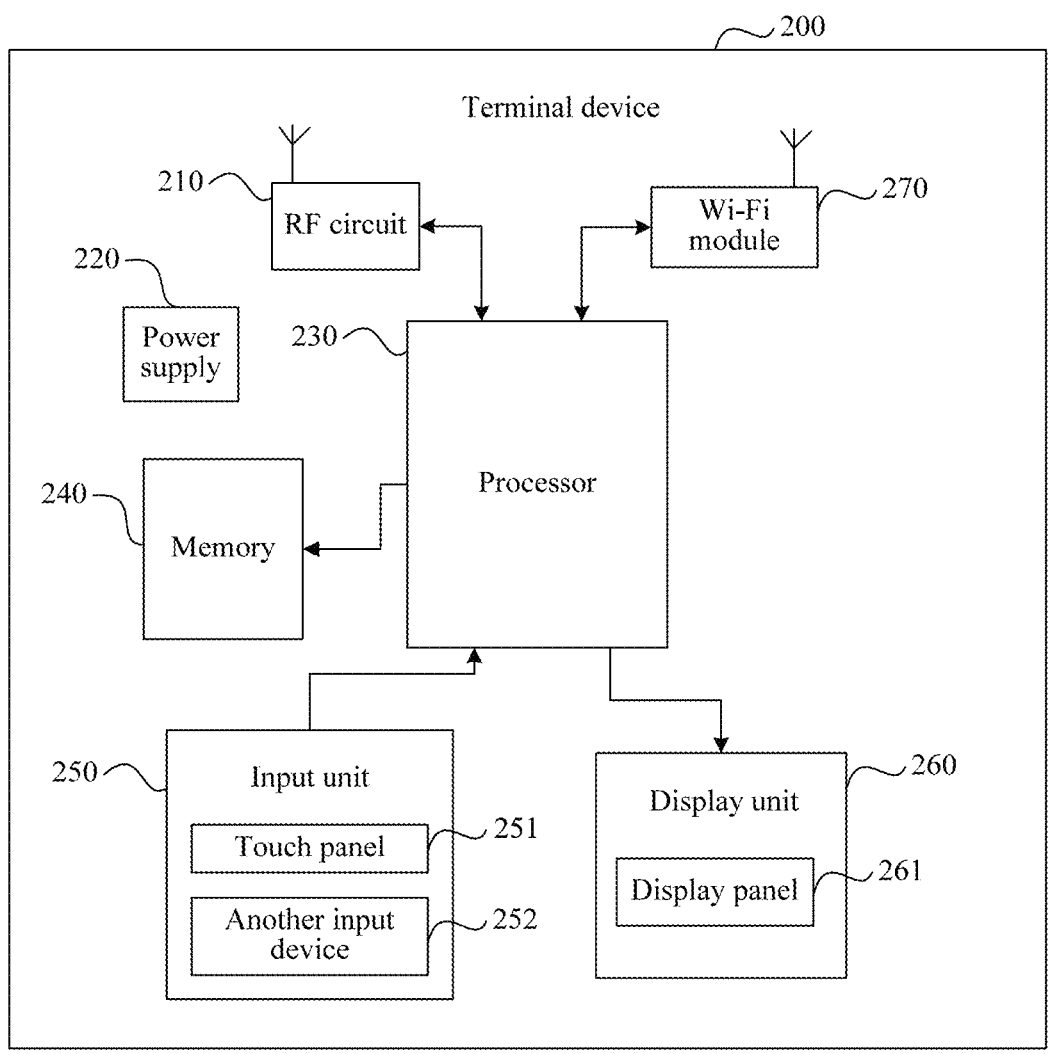
FIG. 2 is a structural diagram of a terminal device according to an embodiment of this application.

FIG. 2 is a diagram of a possible structure a terminal device 200 to which a suspend button display method is applicable according to an embodiment of this application. As shown in FIG. 2, the terminal device 200 includes a radio frequency (RF) circuit 210, a power supply 220, a processor 230, a memory 240, an input unit 250, a display unit 260, a wireless fidelity (Wi-Fi) module 270, and other components. A person skilled in the art may understand that the structure of the terminal device shown in FIG. 2 does not constitute a limitation to the terminal device, and the terminal device provided in this embodiment of this application may include more components or fewer components than those shown in the figure, or combine some components, or arrange different components.

Each component part of the terminal device 200 is described below in detail with reference to FIG. 2.

The RF circuit 210 may be applied to sending and receiving of data in a communication or call process. Particularly, the RF circuit 210 receives downlink data from a base station, and then sends the downlink data to the processor 230 for processing. In addition, the RF circuit 210 sends to-be-sent uplink data to the base station. Usually, the RF circuit 210 includes, but is not limited to, an antenna, at least one amplifier, a transceiver, a coupler, a low noise amplifier (LNA), a duplexer, and the like.

In addition, the RF circuit 210 may further communicate with a network and another device through wireless communication. The wireless communication may use any communication standard or protocol, which includes, but is not limited to, global system for mobile communications (GSM), general packet radio service (GPRS), code division multiple access (CDMA), wideband code division multiple access (WCDMA), long term evolution (LTE), email, short message service (SMS), and the like.

A Wi-Fi technology belongs to a short distance wireless transmission technology. The terminal device 200 may be connected to an access point by using the Wi-Fi module 270, to access a data network. The Wi-Fi circuit 270 may be applied to sending and receiving of data in a communication process.

In one embodiment, the terminal device 200 may further include a communications interface, configured to implement a physical connection to another device. In one embodiment, the communications interface is connected to a communications interface of the another device by using a cable, to implement data transmission between the terminal device 200 and the another device.

In this embodiment, a data transmission function is required for implementing the terminal device 200. Therefore, a communications module needs to be included inside the terminal device 100. FIG. 2 shows the communications modules such as the RF circuit 210 and the Wi-Fi module 270. However, it may be understood that the terminal device 200 includes at least one of the foregoing components or another communications module (for example, a Bluetooth module) configured to implement communication, for data transmission.

For example, when the terminal device 200 is a mobile phone or a wearable device, the terminal device 200 may include the RF circuit 210, and may further include the Wi-Fi module 270; when the terminal device 200 is a computer, the terminal device 200 may include the communications interface, and may further include the Wi-Fi module 270; when the terminal device 200 is a tablet computer, the intelligent terminal device 200 may include the Wi-Fi module 270.

The memory 240 may be configured to store a software program and a module. The processor 230 runs the software program and the module that are stored in the memory 240, to execute various functional applications and data processing of the terminal 200.

In one embodiment, the memory 240 may mainly include a program storage area and a data storage area. The program storage area may store an operating system, various application programs, and the like. The data storage area may store data created based on use of the intelligent terminal device.

In addition, the memory 240 may include a high speed random access memory, and may further include a non-volatile memory, such as at least one magnetic disk storage device, a flash memory, or another volatile solid-state storage device.

The input unit 250 may be configured to receive digit or character information entered by a user, and generate a key input signal related to a user setting and function control of the terminal device 200.

In one embodiment, the input unit 250 may include a touch panel 251 and another input device 252.

The touch panel 251, which is also referred to as a touchscreen, may collect a touch operation (for example, an operation of the user on or near the touch panel 251 by using any suitable object or accessory such as a finger or a stylus) of the user on or near the touch panel, and drive a corresponding connection apparatus based on a preset program. In one embodiment, the touch panel 251 may include two parts: a touch detection apparatus and a touch controller. The touch detection apparatus detects a touch direction of the user, detects a signal generated from the touch operation, and transfers the signal to the touch controller. The touch controller receives touch information from the touch detection apparatus, converts the touch information into touch point coordinates, and then sends the touch point coordinates to the processor 230. Moreover, the touch controller can receive and execute a command sent from the processor 230. In addition, the touch panel 251 may be implemented in a plurality of types such as resistive, capacitive, infrared, surface sound wave types.

In one embodiment, the another input device 252 may include, but is not limited to, one or more of a physical keyboard, a functional key (for example, a volume control key and a switch key), a track ball, a mouse, and a joystick.

The display unit 260 may be configured to display information entered by the user or information provided for the user, various menus of the terminal device 100, and other content. The display unit 260 is a display system of the terminal device 200, and is configured to present a user interface and implement human-device interaction.

The display unit 260 may include a display panel 261. In one embodiment, the display panel 261 may be configured in a form of a liquid crystal display (LCD), an organic light-emitting diode (OLED), or the like.

Further, the touch panel 251 may cover the display panel 261. After detecting the touch operation on or near the touch panel 251, the touch panel 251 transfers the touch operation to the processor 230, to determine a type of a touch event. Then, the processor 230 provides a corresponding visual output on the display panel 261 based on the type of the touch event.

In FIG. 2, the touch panel 251 and the display panel 261 are used as two independent components to implement input and output functions of the terminal device 200. However, in this embodiment, the touch panel 251 and the display panel 261 may be integrated (namely, into the touch display screen in the embodiments of this application) to implement the input and output functions of the terminal device 100.

The processor 230 is a control center of the terminal device 200, and connects various components by using various interfaces and lines. By running or executing the software program and/or module stored in the memory 240, and invoking the data stored in the memory 240, the processor 230 performs the various functions and the data processing of the terminal device 200, thereby implementing various services that are based on the terminal device 200.

In one embodiment, the processor 230 may include one or more processing units. In one embodiment, the processor 230 may integrate an application processor and a modem processor. The application processor mainly processes an operating system, a user interface, an application program, and the like. The modem processor mainly processes wireless communication. It may be understood that the foregoing modem processor may either not be integrated into the processor 230.

The terminal device 200 further includes the power supply 220 (for example, a battery) for supplying power to the components. In one embodiment, the power supply 220 may be logically connected to the processor 230 by using a power management system, thereby implementing functions such as charging, discharging and power consumption management by using the power management system.

Although not shown, various components such as a sensor, an audio frequency circuit, and a camera may be further included in the terminal device 200. Details are not described herein.

Figure 3:
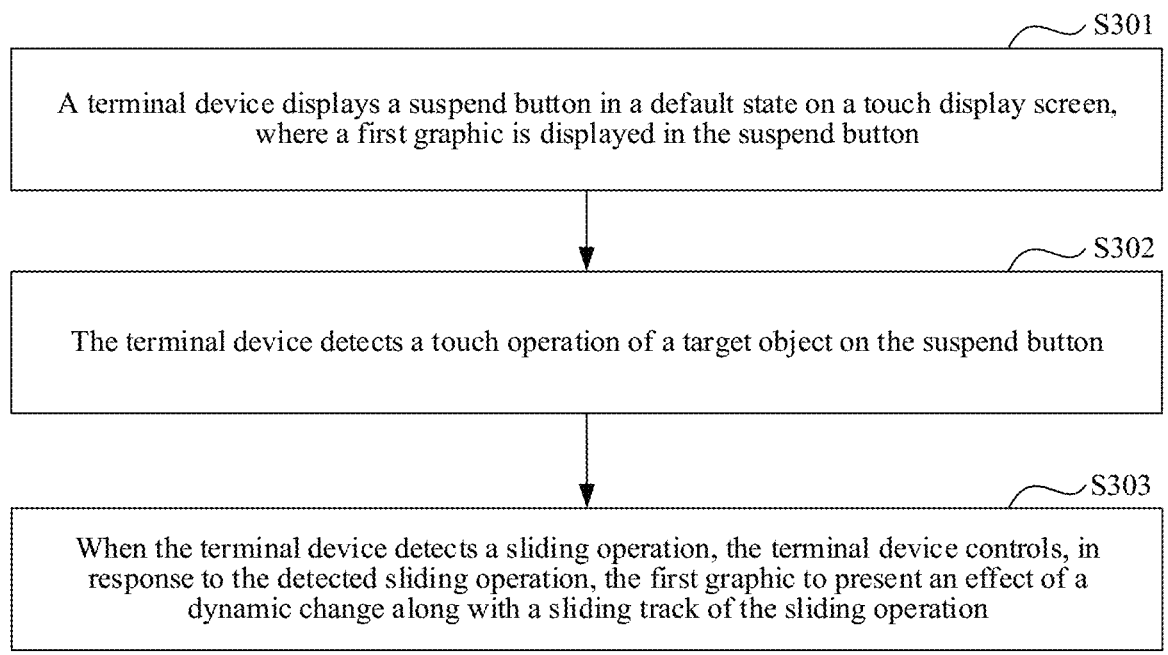
FIG. 3 shows a suspend button display method according to an embodiment of this application.

An embodiment of this application provides a suspend button display method. The method is applicable to the terminal device shown in FIG. 2. The terminal device includes a touch display screen. As shown in FIG. 3, the method includes the following procedures.

S301: The terminal device displays a suspend button in a default state on the touch display screen, where a first graphic is displayed in the suspend button.

The suspend button suspends on a home screen of the terminal device or an uppermost layer of a program interface that is currently running, to form a current user interface.

In one embodiment, when the suspend button includes a plurality of graphic elements, a second graphic is further displayed in the suspend button. In this embodiment, shapes of the first graphic and the second graphic are not limited.

S302: The terminal device detects a touch operation of a target object on the suspend button.

In one embodiment, the terminal device may collect, by using the touch display screen having an input function, the touch operation of a user on or near the touch display screen by using the target object.

S303: When the terminal device detects a sliding operation, the terminal device controls, in response to the detected sliding operation, the first graphic to present an effect of a dynamic change along with a sliding track of the sliding operation, where the dynamic change includes a dynamic change generated when the first graphic is stretched in a direction opposite to a sliding direction.

According to the foregoing steps, for the suspend button, an effect of a dynamic change that is generated when an object having mass, elasticity, and toughness is dragged in a physical world may be simulated, so that the user explicitly senses that the touch operation acts on the suspend button. Therefore, according to the method, display flexibility of the suspend button can be improved, so that visual experience of the user is improved.

In an actual physical world, dragging an elastic object having mass usually changes a shape of the object. For example, an inertia lag phenomenon occurs on the object in a direction opposite to a dragging direction, and the phenomenon causes protrusion deformation of the object in the direction opposite to the dragging direction. Therefore, in one embodiment, the dynamic change generated when the first graphic is stretched in the direction opposite to the sliding direction includes protrusion deformation occurring on the first graphic in the direction opposite to the sliding direction.

According to the method, when the user performs the sliding operation on the suspend button, the suspend button may present an inertia lag phenomenon that is also presented when an elastic object is dragged, so that user experience is closer to that in the physical world.

In one embodiment, in a dynamic change process, a protrusion deformation degree of the first graphic may be related to a parameter such as a sliding track distance of the sliding operation, a touch force of the target object, or a sliding speed of the target object. For example, a larger sliding track distance of the sliding operation, a larger touch force of the target object, or a higher sliding speed of the target object indicates a higher protrusion deformation degree of the first graphic.

In one embodiment, the dynamic change further includes displacement of the first graphic that is generated along with the sliding track.

A displacement direction of the first graphic is the sliding direction.

When a force for dragging an actual object is sufficiently large, the object may be displaced. Therefore, according to the method, when the user performs the sliding operation on the suspend button, the protrusion deformation occurs on the first graphic, and further, the first graphic is displaced, so that an effect achieved when the actual object is dragged in the physical world can be further simulated. In addition, when the user performs the sliding operation on the suspend button to drag the suspend button on the touch display screen, the first graphic also needs to be displaced.

Figure 4:
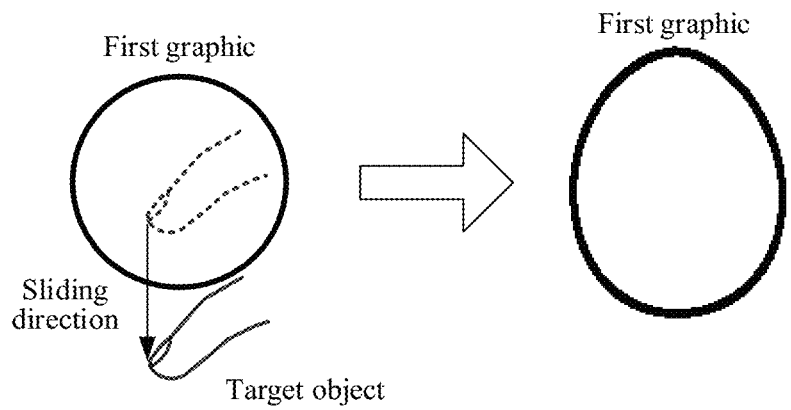
FIG. 4 is a diagram of a first display example of a suspend button according to an embodiment of this application.

In one embodiment, in the suspend button in the default state, a default state of the first graphic is circular. Then, correspondingly, in the suspend button presenting the effect of the dynamic change, the first graphic during the dynamic change is water droplet-shaped or quasi-elliptical. For example, as shown in FIG. 4, when the target object slides the suspend button downward, the first graphic presents a shape on the right side.

In one embodiment, to present the effect of the dynamic change of the first graphic, before the sliding operation ends or a deformation upper limit of the first graphic is not reached, the first graphic may present the effect of the dynamic change through a plurality of times of changes.

In one embodiment, the change of the first graphic may be, but is not limited to being, implemented by using the following several methods.

First Method:

In the dynamic change process of the first graphic, the first graphic changing each time is generated by the terminal device by performing a metaball algorithm on a reference graphic and an auxiliary circle.

A size of the reference graphic is the same as that of the first graphic in the default state, and a first circle center distance is less than a second circle center distance, where the first circle center distance is a distance between a circle center of the reference graphic and a circle center of the auxiliary circle when the first graphic changing for the $N^{th}$ time is generated, and the second circle center distance is a distance between the circle center of the reference graphic and the circle center of the auxiliary circle when the first graphic changing for an $(N+1)^{th}$ time is generated, where N is an integer greater than or equal to 1.

A size of the auxiliary circle may be specifically set based on a factor such as an actual scenario or the protrusion deformation degree of the first graphic.

In the metaball algorithm, a distance between the circle center of the reference graphic and the circle center of the auxiliary circle each time the first graphic changes influences the protrusion deformation degree of the first graphic. Therefore, when a circle center distance between the reference graphic and the auxiliary circle each time the first graphic deforms is less than a circle center distance between the reference graphic and the auxiliary circle next time the first graphic deforms, a protrusion degree of the first graphic that is generated due to deformation next time may be higher than a protrusion degree of the first graphic that is generated due to deformation this time, so that when the first graphic presents the dynamic change along with the sliding track of the sliding operation, a longer sliding track indicates a higher protrusion degree of the first graphic.

In addition, a location of the first graphic that is generated through the metaball algorithm is related to a location of the reference graphic. Therefore, when the first graphic changing each time is not displaced, the location of the reference graphic also does not change; and when the first graphic changing each time is displaced, the location of the reference graphic also changes. However, it should be noted that when the first graphic changing each time is displaced, and when the first graphic changing for a first time is generated, the location of the reference graphic is the same as that of the first graphic.

Figure 5:
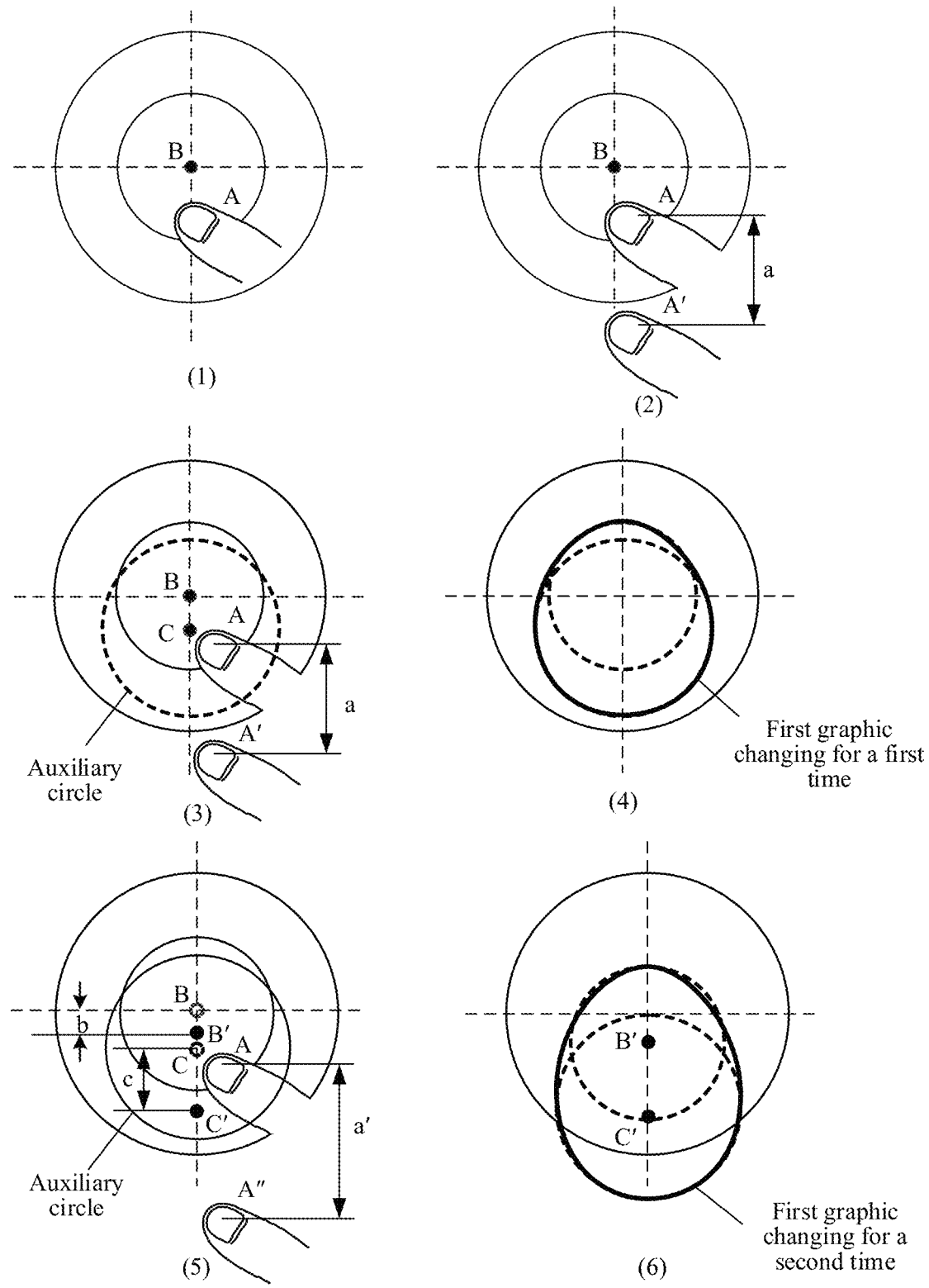
FIG. 5 is a diagram of a second display example of a suspend button according to an embodiment of this application.

An example is used, by using the accompanying drawings, for describing generation of the first graphic by using the first method, as shown in FIG. 5.

In this example, the suspend button includes two graphic elements. The suspend button in the default state is shown in figure (1) in FIG. 5. An inner ring in figure (1) is the first graphic. B is a circle center of the first graphic, and A is an initial location of the target object (a finger).

When the finger performs the sliding operation (where the sliding direction is downward) on the suspend button, the finger moves from the location A to a location A', and a sliding distance of the finger is a, as shown in figure (2).

The terminal device generates and displays the first graphic during the dynamic change in response to the sliding operation.

When the terminal device generates the first graphic changing for the first time, as shown in figure (3), a location of the circle center of the reference graphic (whose size is the same as the size of the first graphic in the default state) is determined as B, and a location of the circle center of the auxiliary circle required for the change this time is determined as C, where a direction from B to C is the sliding direction of the finger. The terminal device performs the metaball algorithm on the reference graphic and the auxiliary circle that are determined during the change this time, to generate the first graphic changing for the first time, as shown in figure (4).

When the finger continues to slide, to be specific, the finger slides from the location A' to a location A'', and when the terminal device generates the first graphic changing for a second time, as shown in figure (5), a location of the circle center of the reference graphic is determined as B', and a location of the circle center of the auxiliary circle required for the change this time is determined as C'. To be specific, compared with the change last time, the location of the circle center of the reference graphic travels b, and the location of the circle center of the auxiliary circle travels c. The terminal device performs the metaball algorithm on the reference graphic and the auxiliary circle that are determined during the change this time, to generate the first graphic changing for the second time, as shown in figure (6).

Subsequently, the finger continues to slide. The terminal device may determine locations of the reference graphic and the auxiliary circle still based on the foregoing method, to determine the first graphic changing each time, until the finger no longer slides and the sliding operation ends, or until the deformation upper limit of the first graphic is reached. For specific steps, refer to the foregoing steps. Details are not described herein again.

It should be noted that because in the first method, the first circle center distance is less than the second circle center distance, a distance from B' to C' is greater than a distance from B to C. In addition, to ensure that the generated first graphic is water droplet-shaped, the distance between the circle center of the reference graphic and the circle center of the auxiliary circle that is determined each time the first graphic changes is less than a first threshold; and compared with a change last time, a circle center moving distance (for example, b) of the reference graphic is less than a second threshold, and a circle center moving distance (for example, c) of the auxiliary circle is less than a third threshold.

Second Method:

In the dynamic change process of the first graphic, the first graphic changing for the first time is generated by the terminal device by performing stretching processing on a first part of the first graphic in the default state, and the first graphic changing for an $M^{th}$ time is generated by the terminal device by performing stretching processing on the first part of the first graphic changing for an $(M-1)^{th}$ time.

The first part of the first graphic in the default state is one part that is in two parts into which the first graphic in the default state is divided based on a division line perpendicular to the sliding direction and that is located in the direction opposite to the sliding direction relative to the division line, where M is an integer greater than 2.

In one embodiment, in the dynamic change process of the first graphic, the first graphic changing for the first time is generated by the terminal device by performing compression processing on a second part of the first graphic in the default state, and the first graphic changing for the $M^{th}$ time is generated by the terminal device by performing compression processing on the second part of the first graphic changing for the $(M-1)^{th}$ time.

The second part of the first graphic in the default state is a part other than the first part in the two parts into which the first graphic in the default state is divided.

Figure 6:
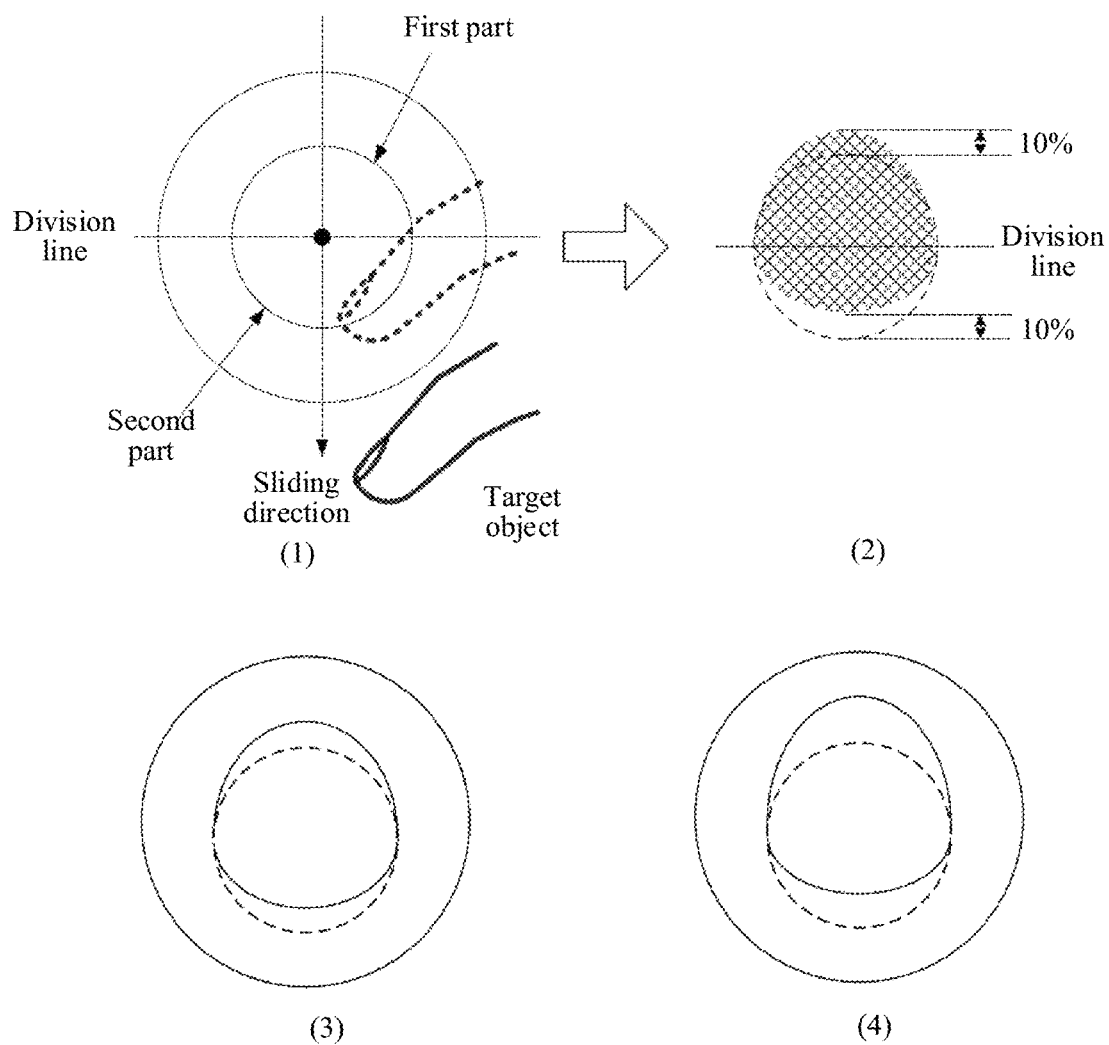
FIG. 6 is a diagram of a third display example of a suspend button according to an embodiment of this application.

An example is used, by using the accompanying drawings, for describing generation of the first graphic by using the second method. An example in which the suspend button is shown in figure (1) in FIG. 5 is still used, as shown in FIG. 6.

When a finger performs the sliding operation (where the sliding direction is downward) on the suspend button, and when the finger moves, as shown in figure (1), the terminal device determines the division line of the first graphic, where the division line is perpendicular to the sliding direction. The first graphic in the default state is divided into two parts based on the division line. As shown in the figure, one part in the direction opposite to the sliding direction relative to the division line is the first part, and the other part in the sliding direction relative to the division line is the second part.

The terminal device stretches the first part by a first proportion, and compresses the second part by a second proportion (where the first proportion and the second proportion may be the same or different, and in the example shown in figure (2), the first proportion and the second proportion are both 10%), to generate the first graphic changing for the first time, as shown in figure (3). In actual applications, to enable the first graphic to present a gradient effect, the first proportion and the second proportion may be set to a value pair for comparison.

When the finger continues to slide, the terminal device stretches the first part changing last time by a third proportion, and compresses the second part changing last time by a fourth proportion, to generate the first graphic changing for a second time, as shown in figure (4). The third proportion and the first proportion may be the same or different, and the fourth proportion and the second proportion may be the same or different. This is not limited in this application.

Subsequently, the finger continues to slide. The terminal device may stretch the first part and compress the second part still based on the foregoing method, to determine the first graphic changing each time, until the finger no longer slides and the sliding operation ends, or until the deformation upper limit of the first graphic is reached. For specific steps, refer to the foregoing steps. Details are not described herein again.

According to the foregoing method, when the user performs the sliding operation on the suspend button, the suspend button may present a water droplet shape or a quasi-ellipse, so that user experience is closer to that in the physical world.

In one embodiment, when the second graphic is further displayed in the suspend button, and when the suspend button is in the default state, a whole of the first graphic covers the second graphic. An area surrounded by an outer outline of the second graphic is greater than an area surrounded by an outer outline of the first graphic.

In one embodiment, in a process in which the first graphic presents the effect of the dynamic change along with the sliding track of the sliding operation, the whole or a part of the first graphic covers the second graphic. To be specific, the changing first graphic cannot go beyond the outer outline of the second graphic.

When the first graphic and the second graphic are displayed in the suspend button, to ensure that in the suspend button presenting the effect of the dynamic change, the whole or the part of the first graphic covers the second graphic, this embodiment of this application provides two implementations.

First Implementation:

The first graphic and the second graphic of the suspend button are respectively displayed at different display layers (similar to image layers). To be specific, the first graphic is displayed at a first display layer, the second graphic is displayed at a second display layer, and the first display layer is located above the second display layer. An outline of the first display layer is the same as the outer outline of the first graphic, and an outline of the second display layer is the same as the outer outline of the second graphic.

When the suspend button is in the default state, a whole of the first display layer covers the second display layer.

In the process in which the first graphic presents the effect of the dynamic change along with the sliding track of the sliding operation, the whole or a part of the first display layer covers the second display layer, so that in the process in which the first graphic presents the effect of the dynamic change along with the sliding track of the sliding operation, the whole or the part of the first graphic covers the second graphic.

Second Implementation:

The terminal device obtains a plurality of to-be-displayed image frames corresponding to an effect of a dynamic change that the whole or the part of the first graphic covers the second graphic in the process in which the first graphic presents the effect of the dynamic change along with the sliding track of the sliding operation, and sequentially displays the plurality of image frames, so that in the process in which the first graphic presents the effect of the dynamic change along with the sliding track of the sliding operation, the effect of the dynamic change that the whole or the part of the first graphic covers the second graphic is achieved.

In one embodiment, the plurality of image frames are obtained through changing based on a group of image frames. A plurality of image frames are obtained through changing based on a group of image frames. In one embodiment, a group of image frames are pre-generated. The group of image frames include image frames corresponding to an effect achieved when the first graphic moves in a first direction (e.g., the image frames visually include a first image and a second image). Then, angles of to-be-displayed images in a next frame are determined based on touch data when another direction needs to be displayed (because a touch track may be in any direction). Then, angle adjustment is performed on the image frames corresponding to the first direction, so that a current to-be-displayed image frame is obtained and displayed.

In this embodiment, only image frames corresponding to moving in one direction are pre-stored, and image frames at any angle do not need to be stored. Therefore, relatively small memory is occupied.

In one embodiment, in the process in which the first graphic presents the effect of the dynamic change along with the sliding track of the sliding operation, a dynamic change generated when the second graphic is stretched in the direction opposite to the sliding direction occurs on the second graphic. In one embodiment, protrusion deformation may also occur on the second graphic in the direction opposite to the sliding direction.

Similar to the change of the first graphic, when the second graphic is also circular, the second graphic during a dynamic change may also be water droplet-shaped or quasi-elliptical. For a method for generating the second graphic changing each time, refer to the method for generating the changing first graphic. Details are not described herein again.

In addition, when a dynamic change generated due to stretching occurs on each of the first graphic and the second graphic, a protrusion deformation degree of the second graphic may be less than the protrusion deformation degree of the first graphic.

In one embodiment, the second graphic may not be displaced along with the sliding track, but fixed at a location. In this way, during the dynamic change of the first graphic, an effect that the first graphic (for example, a small circle) moves relative to the second graphic (for example, a large circle) may be presented.

In one embodiment, the dynamic change of the first graphic further includes the displacement of the first graphic that is generated along with the sliding track.

When the first graphic is displaced, the terminal device may trigger, based on a displacement distance of the first graphic and a location of the displaced first graphic, an instruction corresponding to performing of the sliding operation. To be specific, when the displacement of the first graphic that is generated along with the sliding track of the sliding operation exceeds a specified distance or the first graphic moves to a specified location, the terminal device executes the instruction corresponding to the sliding operation. In one embodiment, when the displacement of the first graphic that is generated along with the sliding track of the sliding operation exceeds the specified distance or the first graphic moves to the specified location, the terminal device may further display the suspend button restored to the default state.

In one embodiment, when the user performs the sliding operation on the suspend button to drag the suspend button on the touch display screen, the second graphic needs to be displaced. When the second graphic is displaced, the first graphic is correspondingly displaced, and a distance and a direction of the displacement of the first graphic are basically the same as those of the displacement of the second graphic. In this way, the user can observe that the first graphic and the second graphic in the suspend button are simultaneously displaced.

In one embodiment, when the first graphic and/or the second graphic is displaced, the terminal device further needs to detect whether a factor, for example, a keyboard, a navigation bar, or a screen edge, that cannot normally display the suspend button exists at a location of the displaced first graphic and/or second graphic. If the factor exists, the terminal device restores the location of the first graphic and/or the second graphic to a location before displacement or a touch operation this time, to be specific, a location at which no foregoing factor exists.

In one embodiment, before the terminal device detects the sliding operation, the method further includes:

detecting, by the terminal device, a first touch and hold operation, where the first touch and hold operation is an operation of the target object on the suspend button for a touch time exceeding first duration; and enabling, by the terminal device in response to the detected first touch and hold operation, a function of responding to the sliding operation.

According to the foregoing method, the user may enable, through the first touch and hold operation, the terminal device to enable the function of responding to the sliding operation, to avoid a power consumption waste and a resource waste that result from enabling of the function by the terminal device for a long time.

In one embodiment, when the terminal device detects that the sliding operation ends, the terminal device displays the suspend button restored to the default state.

In one embodiment, when the terminal device displays the suspend button whose state is to be restored, the suspend button changing last time may be restored to the suspend button in the default state through a transition animation, so that a change of the suspend button may have a transition process, and a problem of relatively poor visual effect of the user due to abrupt and direct replacement is avoided.

In one embodiment, when the terminal device detects that the sliding operation ends, the terminal device executes an instruction corresponding to the sliding operation.

In one embodiment, the user may set the instruction corresponding to the sliding operation. For example, in a case of the sliding operation (e.g., the sliding direction, a sliding distance, the sliding track, or a sliding force or speed, etc.), the sliding operation corresponds to an instruction of returning to the home screen. For another example, when the sliding operation is differentiated based on the sliding direction, the terminal device further need to determine the sliding direction of the sliding operation, and determine an instruction corresponding to the sliding direction. The instruction corresponding to the sliding direction may be, for example, an instruction of returning to the home screen that corresponds to sliding leftward or an instruction of performing a return operation that corresponds to sliding upward.

In one embodiment, when the terminal device detects a tap operation or a second touch and hold operation, the terminal device controls, in response to the detected tap operation or second touch and hold operation, the suspend button to first present an effect that the first graphic is zoomed in or zoomed out by a specified proportion, and then displays the suspend button restored to the default state, where the second touch and hold operation is an operation of the target object on the suspend button for a touch time exceeding second duration.

Figure 7:
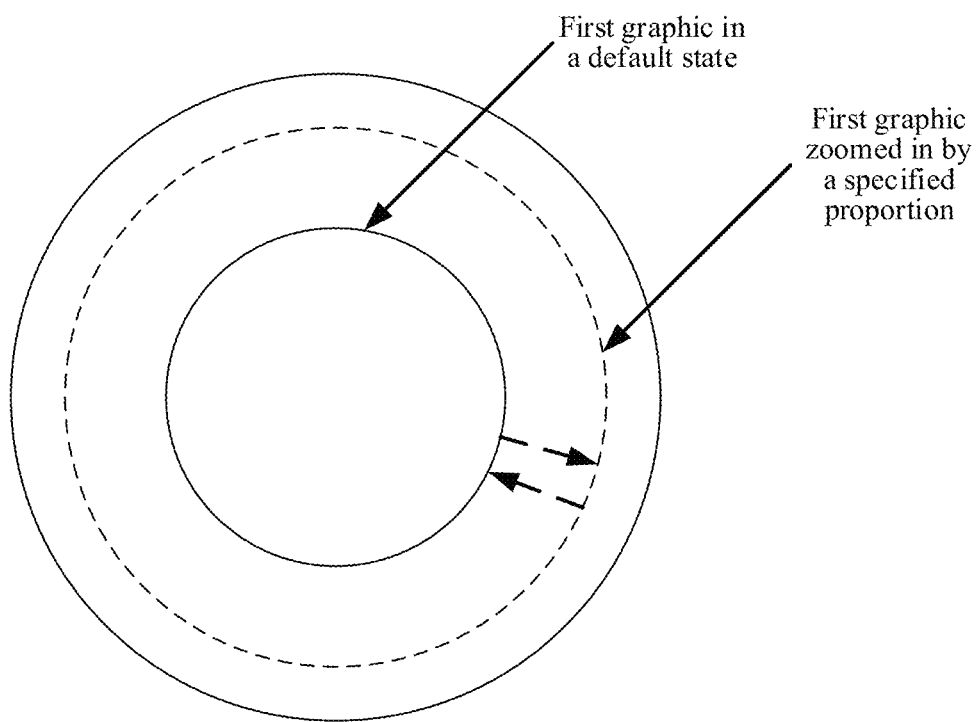
FIG. 7 is a diagram of a fourth display example of a suspend button according to an embodiment of this application.

For example, as shown in FIG. 7, when the terminal device detects the tap operation, the terminal device may display the first graphic that is gradually zoomed in by the specified proportion and then gradually restored to the default state.

In addition, it should be further noted that when the second graphic is further displayed in the suspend button, before the terminal device displays the suspend button restored to the default state, the terminal device may also first display the second graphic zoomed in or zoomed out by the specified proportion.

In one embodiment, to differentially respond to the tap operation and the second touch and hold operation, the first graphic is zoomed in or zoomed out by different proportions, and/or the second graphic is zoomed in or zoomed out by different proportions.

According to the foregoing method, the suspend button may notify, through a zoom effect, the user that the suspend button has been tapped or touched and held. Therefore, according to the method, the display flexibility of the suspend button and the visual experience of the user can also be improved.

In one embodiment, when the first graphic is zoomed in or zoomed out by the specified proportion, a visual parameter of the first graphic changes, where the visual parameter is at least one of the following: transparency, color, brightness, and gradation.

Similarly, when the second graphic is zoomed in or zoomed out, a visual parameter of the second graphic may also change. This is not limited in this application.

In one embodiment, after the terminal device detects the tap operation or the second touch and hold operation, the terminal device executes an instruction corresponding to the tap operation or the second touch and hold operation.

Currently, the terminal device displays an interface on the touch display screen by using a display area view. The terminal device may add the view to the touch display screen by using a window manager based on an interface that needs to be displayed. The suspend button needs to suspend on the home screen of the terminal device or the uppermost layer of the program interface. Therefore, a view in which the suspend button is located is different from a view in which the home screen or the program interface is located.

In addition, because in this embodiment of this application, the suspend button may present a dynamic change due to stretching in any direction, to ensure a display effect of the suspend button, an area of the view in which the suspend button is located needs to be greater than an area of the suspend button in the default state. However, an excessively large area of the view in which the suspend button causes a problem that the user cannot see content on a home screen or a program interface that is covered by the view, and cannot continue to operate the content. This causes lower user experience.

To display the suspend button presenting the dynamic effect on the touch display screen of the terminal device, and ensure user experience, in this embodiment of this application, the suspend button occupies two layers of views. In one embodiment, the suspend button includes a first display area and a second display area, where the first display area is used to display the suspend button, the second display area is set to be transparent (e.g., no content is displayed in the second display area), and an area of the first display is greater than an area of the second display area. The second display area is used by the terminal device to determine an operation location of the suspend button. In one embodiment, the terminal device detects, by detecting whether the target object touches a location of the second display area, whether the target object performs a touch operation on the suspend button.

In one embodiment, S302 includes:

detecting, by the terminal device, a touch operation of the target object at a location of the second display area on the touch display screen, to detect the touch operation of the target object on the suspend button.

Figure 8:
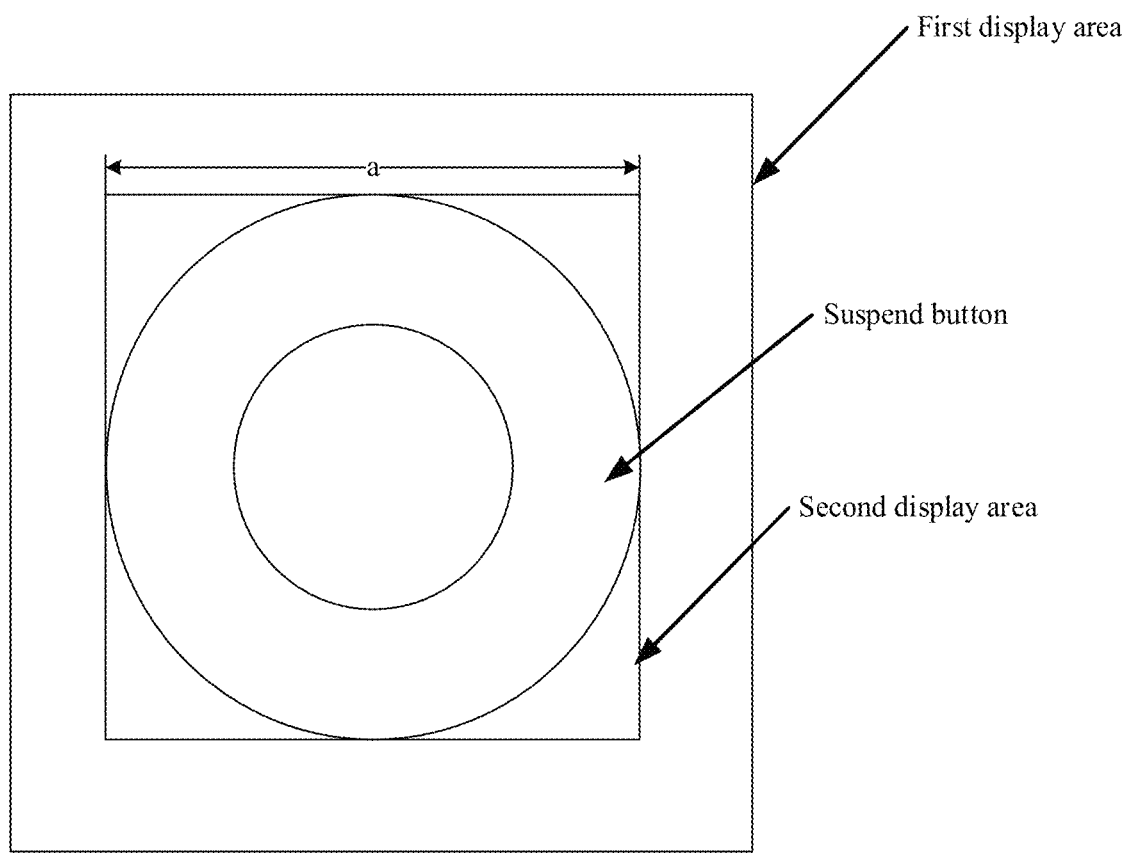
FIG. 8 is a schematic diagram of a size relationship between a suspend button and display areas according to an embodiment of this application.

In one embodiment, the area of the second display area is basically consistent with an area surrounded by an outer outline of the suspend button in the default state. For example, as shown in FIG. 8, the second display area and the first display area are both square, a length of a side of the second display area is the same as a diameter a of the outer outline of the suspend button, and a length of a side of the first display area is greater than the length of the side of the second display area.

Figure 9:
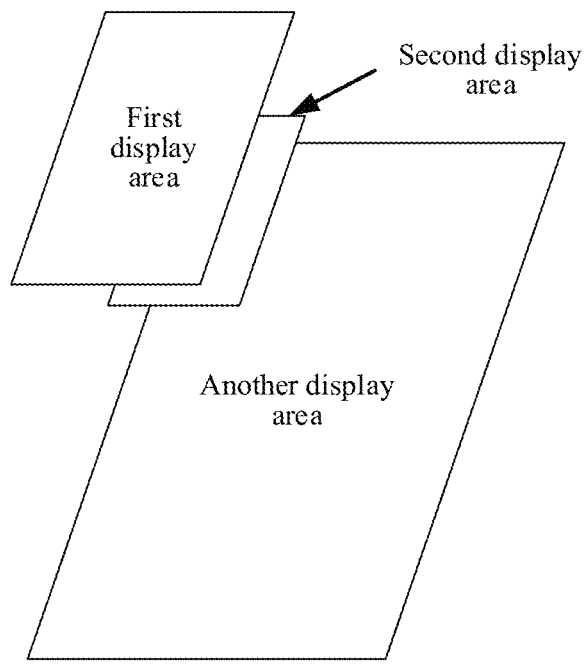
FIG. 9 is a schematic diagram of a location relationship between display areas according to an embodiment of this application.

In one embodiment, on the touch display screen, the first display area is located above the second display area. FIG. 9 shows a location relationship between the first display area, the second display area, and another display area in which the home screen or the program interface is located.

It should be further noted that when the suspend button moves (e.g., a case in which the first graphic is not deformed and the first graphic and the second graphic move together), the first display area and the second display area are also correspondingly displaced synchronously.

In this embodiment, the second display area displays no content. Therefore, setting the second display area has relatively small impact on power consumption and performance of the terminal device.

By using the method provided in this embodiment of this application, when the terminal device detects that the target object performs the sliding operation on the suspend button, the terminal device may control the suspend button to present the effect of the dynamic change. In this way, the suspend button may present a plurality of display forms. Therefore, according to the method, the display flexibility of the suspend button can be improved, so that the visual experience of the user is improved.

Figure 10:
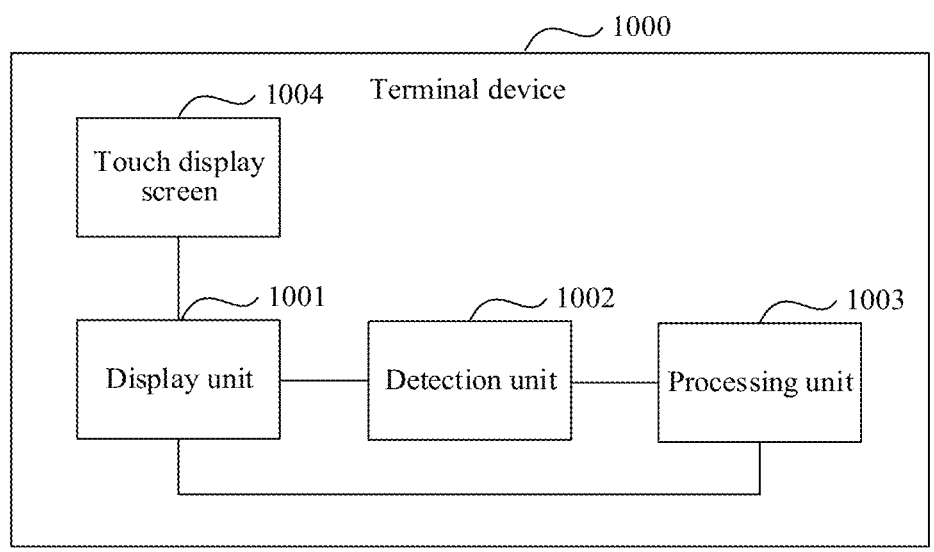
FIG. 10 is a schematic structural diagram of a terminal device according to an embodiment of this application.

Based on the foregoing embodiment, this application further provides a terminal device 1000. The terminal device 1000 is configured to implement the suspend button display method shown in FIG. 3. As shown in FIG. 10, the terminal device 1000 includes a display unit 1001, a detection unit 1002, a processing unit 1003, and a touch display screen 1004.

The display unit 1001 is configured to display a suspend button in a default state on the touch display screen 1004, where a first graphic is displayed in the suspend button.

The detection unit 1002 is configured to detect a touch operation of a target object on the suspend button.

The processing unit 1003 is configured to: when the detection unit 1002 detects a sliding operation, control, by using the display unit 1001 in response to the detected sliding operation, the first graphic to present an effect of a dynamic change along with a sliding track of the sliding operation, where the dynamic change includes a dynamic change generated when the first graphic is stretched in a direction opposite to a sliding direction.

In one embodiment, the dynamic change generated when the first graphic is stretched in the direction opposite to the sliding direction includes protrusion deformation occurring on the first graphic in the direction opposite to the sliding direction.

In one embodiment, in the suspend button in the default state, a default state of the first graphic is circular; and in the suspend button presenting the effect of the dynamic change, the first graphic during the dynamic change is water droplet-shaped or quasi-elliptical.

In one embodiment, in a dynamic change process of the first graphic, the first graphic changing each time is generated by the processing unit by performing a metaball algorithm on a reference graphic and an auxiliary circle.

A size of the reference graphic is the same as that of the first graphic in the default state, and a first circle center distance is less than a second circle center distance, where the first circle center distance is a distance between a circle center of the reference graphic and a circle center of the auxiliary circle when the first graphic changing for the $N^{th}$ time is generated, and the second circle center distance is a distance between the circle center of the reference graphic and the circle center of the auxiliary circle when the first graphic changing for an $(N+1)^{th}$ time is generated, where N is an integer greater than or equal to 1.

In one embodiment, in a dynamic change process of the first graphic, the first graphic changing for a first time is generated by the processing unit by performing stretching processing on a first part of the first graphic in the default state, and the first graphic changing for an $M^{th}$ time is generated by the processing unit by performing stretching processing on the first part of the first graphic changing for an $(M-1)^{th}$ time.

The first part of the first graphic in the default state is one part that is in two parts into which the first graphic in the default state is divided based on a division line perpendicular to the sliding direction and that is located in the direction opposite to the sliding direction relative to the division line, where M is an integer greater than 2.

In one embodiment, in the dynamic change process of the first graphic, the first graphic changing for the first time is generated by the processing unit by performing compression processing on a second part of the first graphic in the default state, and the first graphic changing for the $M^{th}$ time is generated by the processing unit by performing compression processing on the second part of the first graphic changing for the $(M-1)^{th}$ time.

The second part of the first graphic in the default state is a part other than the first part in the two parts into which the first graphic in the default state is divided.

In one embodiment, a second graphic is further displayed in the suspend button; and when the suspend button is in the default state, a whole of the first graphic covers the second graphic.

In one embodiment, in a process in which the first graphic presents the effect of the dynamic change along with the sliding track of the sliding operation, the whole or a part of the first graphic covers the second graphic.

In one embodiment, in the process in which the first graphic presents the effect of the dynamic change along with the sliding track of the sliding operation, a dynamic change generated when the second graphic is stretched in the direction opposite to the sliding direction occurs on the second graphic.

In one embodiment, the second graphic is not displaced along with the sliding track.

In one embodiment, the first graphic is displayed at a first display layer, the second graphic is displayed at a second display layer, and the first display layer is located above the second display layer;

when the suspend button is in the default state, a whole of the first display layer covers the second display layer; and in the process in which the first graphic presents the effect of the dynamic change along with the sliding track of the sliding operation, the whole or a part of the first display layer covers the second display layer, so that in the process in which the first graphic presents the effect of the dynamic change along with the sliding track of the sliding operation, the whole or the part of the first graphic covers the second graphic.

In one embodiment, the processing unit 1003 is configured to:

obtain a plurality of to-be-displayed image frames corresponding to an effect of a dynamic change that the whole or the part of the first graphic covers the second graphic in the process in which the first graphic presents the effect of the dynamic change along with the sliding track of the sliding operation, and sequentially display the plurality of image frames, so that in the process in which the first graphic presents the effect of the dynamic change along with the sliding track of the sliding operation, the effect of the dynamic change that the whole or the part of the first graphic covers the second graphic is achieved.

In one embodiment, the plurality of image frames are obtained through changing based on a group of image frames.

In one embodiment, the detection unit 1002 is further configured to detect a first touch and hold operation before detecting the sliding operation, where the first touch and hold operation is an operation of the target object on the suspend button for a touch time exceeding first duration; and the processing unit 1003 is further configured to enable, in response to the detected first touch and hold operation, a function of responding to the sliding operation.

In one embodiment, the processing unit 1003 is further configured to:

display, by using the display unit 1001 when the detection unit 1002 detects that the sliding operation ends, the suspend button restored to the default state.

In one embodiment, the processing unit 1003 is further configured to:

execute, when the detection unit 1002 detects that the sliding operation ends, an instruction corresponding to the sliding operation.

In one embodiment, the processing unit 1003 is further configured to execute, when displacement of the first graphic that is generated along with the sliding track of the sliding operation exceeds a specified distance or the first graphic moves to a specified location, the instruction corresponding to the sliding operation.

The processing unit 1003 is further configured to: when the detection unit 1002 detects a tap operation or a second touch and hold operation, control, in response to the detected tap operation or second touch and hold operation, the suspend button to first present an effect that the first graphic is zoomed in or zoomed out by a specified proportion, and then display the suspend button restored to the default state, where the second touch and hold operation is an operation of the target object on the suspend button for a touch time exceeding second duration.

In one embodiment, when the first graphic is zoomed in or zoomed out by the specified proportion, a visual parameter of the first graphic changes, where the visual parameter is at least one of the following: transparency, color, brightness, and gradation.

In one embodiment, the processing unit 1003 is further configured to execute an instruction corresponding to the tap operation or the second touch and hold operation.

In one embodiment, the suspend button includes a first display area and a second display area, where the first display area is used to display the suspend button, and an area of the first display is greater than an area of the second display area; and when detecting the touch operation of the target object on the suspend button, the detection unit 1002 is specifically configured to:

detect a touch operation of the target object at a location of the second display area on the touch display screen, to detect the touch operation of the target object on the suspend button.

In one embodiment, the suspend button is a virtual button that has an instruction trigger function and that suspends on a home screen of the terminal device or an uppermost layer of a program interface that is currently running.

An embodiment of this application provides a terminal device. When the terminal device detects that a target object performs a sliding operation on a suspend button, the terminal device may control the suspend button to present an effect of a dynamic change. In this way, the suspend button may present a plurality of display forms. Therefore, according to the method, display flexibility of the suspend button can be improved, so that visual experience of a user is improved.

It should be noted that module division in the embodiments of this application is an example and is merely logical function division, and there may be other division manners during actual implementation. In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a universal serial bus (USB) flash drive, a removable hard disk, a read-only memory (ROM), a random access memory (RAM), a magnetic disk, or a compact disc.

Figure 11:
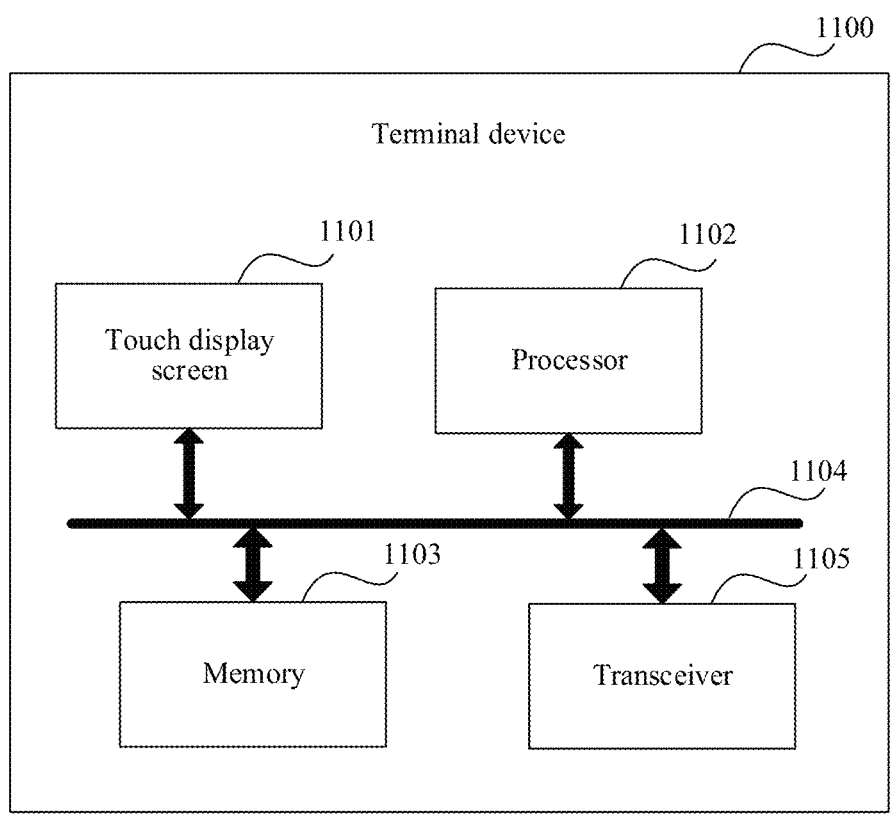
FIG. 11 is a schematic structural diagram of another terminal device according to an embodiment of this application.

Based on the foregoing embodiment, an embodiment of this application further provides a terminal device 1100. The terminal device 1100 is configured to implement the suspend button display method shown in FIG. 3, and has functions of the terminal device 1000 shown in FIG. 10. As shown in FIG. 11, the terminal device 1100 includes a touch display screen 1101, a processor 1102, and a memory 1103.

The touch display screen 1101, the processor 1102, and the memory 1103 are connected to each other. In one embodiment, the touch display screen 1101, the processor 1102, and the memory 1103 may be connected to each other by using a bus 1104. The bus 1104 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 11, but this does not indicate that there is only one bus or only one type of bus.

In one embodiment, the terminal device 1100 further includes a transceiver 1105, configured to communicate and interact with another device.

The processor 1102 is configured to implement the suspend button display method shown in FIG. 3. For details, refer to the description in the foregoing embodiment. Details are not described herein again.

The memory 1103 is configured to store a program instruction and the like. Specifically, the program instruction may include program code, and the program code includes a computer operation instruction. The memory 1103 may include a random access memory (RAM), or may include a non-volatile memory, for example, at least one magnetic disk memory. The processor 1102 executes a program stored in the memory 1103, to implement the foregoing functions, thereby implementing the suspend button display method shown in FIG. 3.

In conclusion, the embodiments of this application provide a suspend button display method and a terminal device. In the solutions, when a terminal device detects that a target object performs a sliding operation on a suspend button, the terminal device may control the suspend button to present an effect of a dynamic change. In this way, the suspend button may present a plurality of display forms. Therefore, according to the method, display flexibility of the suspend button can be improved, so that visual experience of a user is improved.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (or system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to this application without departing from the scope of this application. In this way, this application is intended to cover these modifications and variations of this application provided that they fall within the scope defined by the following claims and their equivalent technologies.

What is claimed is:

1. A computer-implemented method of providing a suspend button display on a terminal device, the method comprising:
    displaying a suspend button in a default state on a touch display screen of the terminal device, wherein a first graphic is displayed in the suspend button;
    detecting a tap operation or a second touch and hold operation, wherein the second touch and hold operation is an operation of a target object on the suspend button for a touch time exceeding a second duration;
    controlling the suspend button to present an effect that the first graphic is zoomed in or zoomed out, and then displaying the suspend button restored to the default state;
    detecting a sliding operation of the target object on the suspend button;
    controlling the first graphic to present a dynamic change along with a sliding track of the sliding operation, wherein the dynamic change comprises protrusion deformation occurring on the first graphic in a direction opposite to a sliding direction;
    displaying a second graphic in the suspend button, wherein the second graphic is covered by an entirety of the first graphic when the suspend button is in the default state; and
    during controlling the first graphic to present the dynamic change along with the sliding track of the sliding operation, covering the second graphic with the entirety or a part of the first graphic.

2. The method according to claim 1, wherein
    in the default state, the first graphic is circular; and
    the first graphic during the dynamic change is water droplet-shaped or quasi-elliptical.

3. The method according to claim 2, further comprising:
    during the sliding operation, dynamically changing the first graphic by performing a metaball algorithm on a reference graphic and an auxiliary circle,
    wherein a size of the reference graphic is the same as that of the first graphic in the default state, and a first circle center distance is less than a second circle center distance, wherein the first circle center distance is a distance between a circle center of the reference graphic and a circle center of the auxiliary circle when the first graphic changing for an $N^{th}$ time is generated, and the second circle center distance is a distance between the circle center of the reference graphic and the circle center of the auxiliary circle when the first graphic changing for an $(N+1)^{th}$ time is generated, wherein N is an integer greater than or equal to 1.

4. The method according to claim 2, further comprising:
    during the sliding operation, changing the first graphic for a first time by performing stretching processing on a first part of the first graphic in the default state, and changing the first graphic for an $M^{th}$ time is generated by the terminal device by performing stretching processing on the first part of the first graphic changing for an (M−1)th time, wherein
    the first part of the first graphic in the default state is one part that is in two parts into which the first graphic in the default state is divided based on a division line perpendicular to the sliding direction and that is located in the direction opposite to the sliding direction relative to the division line, wherein M is an integer greater than 2.

5. The method according to claim 4, wherein changing the first graphic for the first time comprises performing compression processing on a second part of the first graphic in the default state, and changing the first graphic for the $M^{th}$ time comprises performing compression processing on the second part of the first graphic changing for the $(M-1)^{th}$ time,
wherein the second part of the first graphic in the default state is a part other than the first part in the two parts into which the first graphic in the default state is divided.

6. The method according to claim 1, further comprising: during controlling the first graphic to present the dynamic change along with the sliding track of the sliding operation, stretching the second graphic in the direction opposite to the sliding direction.

7. The method according to claim 1, wherein
the second graphic is not displaced along with the sliding track.

8. The method according to claim 1, further comprising:
displaying the first graphic at a first display layer, and displaying the second graphic at a second display layer, wherein the first display layer is located above the second display layer;
when the suspend button is in the default state, covering the second display layer with an entirety of the first display layer; and
wherein controlling the first graphic to present the effect of the dynamic change along with the sliding track of the sliding operation comprises covering the second display layer with the entirety or a part of the first display layer, so that the entirety or the part of the first graphic covers the second graphic during the dynamic change along with the sliding track of the sliding operation.

9. The method according to claim 1, further comprising:
obtaining a plurality of to-be-displayed image frames corresponding to an effect of a dynamic change that the entirety or the part of the first graphic covers the second graphic in a process in which the first graphic presents the effect of the dynamic change along with the sliding track of the sliding operation, and sequentially displaying the plurality of image frames, so that in the process in which the first graphic presents the effect of the dynamic change along with the sliding track of the sliding operation, the effect of the dynamic change that the whole or the part of the first graphic covers the second graphic is achieved.

10. The method according to claim 9, wherein
the plurality of image frames are obtained from a group of image frames.

11. The method according to claim 1, further comprising:
prior to detecting a sliding operation,
detecting a first touch and hold operation that is an operation of the target object on the suspend button for a touch time exceeding a first duration; and
in response to detecting the first touch and hold operation, enabling a function of responding to the sliding operation.

12. The method according to claim 1, further comprising:
in response to detecting that a sliding operation ends, displaying the suspend button restored to the default state; and executing an instruction corresponding to the sliding operation.

13. The method according to claim 1, further comprising:
when displacement of the first graphic that is generated along with a sliding track of a sliding operation exceeds a specified distance or the first graphic moves to a specified location, executing an instruction corresponding to the sliding operation.

14. The method according to claim 1, wherein controlling the suspend button to present the effect that the first graphic is zoomed in or zoomed out comprises changing a visual parameter of the first graphic, wherein the visual parameter is at least one of: transparency, color, brightness, or gradation.

15. The method according to claim 1, further comprising:
executing an instruction corresponding to the tap operation or the second touch and hold operation.

16. The method according to claim 1, wherein
the suspend button comprises a first display area and a second display area, wherein the first display area is used to display the suspend button, and an area of the first display is greater than an area of the second display area; and
detecting a touch operation of the target object on the suspend button comprises:
detecting a touch operation of the target object at a location of the second display area on the touch display screen, to detect the touch operation of the target object on the suspend button.

17. A terminal device, comprising:
at least one processor;
at least one display screen; and
at least one storage medium configured to store a program, which when executed by the at least one processor, causes the terminal device to
display a suspend button in a default state on a touch display screen of the terminal device, wherein a first graphic is displayed in the suspend button;
detect a tap operation or a second touch and hold operation, wherein the second touch and hold operation is an operation of a target object on the suspend button for a touch time exceeding a second duration;
control the suspend button to present an effect that the first graphic is zoomed in or zoomed out, and then display the suspend button restored to the default state;
detect a sliding operation of the target object on the suspend button;
control the first graphic to present a dynamic change along with a sliding track of the sliding operation, wherein the dynamic change comprises protrusion deformation occurring on the first graphic in a direction opposite to a sliding direction;
display a second graphic in the suspend button, wherein the second graphic is covered by an entirety of the first graphic when the suspend button is in the default state; and
during controlling the first graphic to present the dynamic change along with the sliding track of the sliding operation, cover the second graphic with the entirety or a part of the first graphic.

18. A non-transitory computer storage medium comprising computer-readable instructions, which when executed by one or more processors, cause the one or more processors to:
display a suspend button in a default state on a touch display screen of a terminal device, wherein a first graphic is displayed in the suspend button;

detect a tap operation or a second touch and hold operation, wherein the second touch and hold operation is an operation of a target object on the suspend button for a touch time exceeding a second duration;

control the suspend button to present an effect that the first graphic is zoomed in or zoomed out, and then display the suspend button restored to the default state;

detect a sliding operation of the target object on the suspend button;

control the first graphic to present a dynamic change along with a sliding track of the sliding operation, wherein the dynamic change comprises protrusion deformation occurring on the first graphic in a direction opposite to a sliding direction;

display a second graphic in the suspend button, wherein the second graphic is covered by an entirety of the first graphic when the suspend button is in the default state; and during controlling the first graphic to present the dynamic change along with the sliding track of the sliding operation, cover the second graphic with the entirety or a part of the first graphic.

\* \* \* \* \*